(12) United States Patent
Dusina et al.

(10) Patent No.: US 7,878,547 B2
(45) Date of Patent: Feb. 1, 2011

(54) SEATBELT ANCHOR ASSEMBLY

(75) Inventors: Frank J. Dusina, Macomb, MI (US);
Heidi L. Penrod, Pontiac, MI (US);
Ronald F. Rucins, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 223 days.

(21) Appl. No.: 12/173,379

(22) Filed: Jul. 15, 2008

(65) Prior Publication Data

US 2010/0013258 A1 Jan. 21, 2010

(51) Int. Cl.
*B60R 22/00* (2006.01)
(52) U.S. Cl. .................. 280/801.1; 297/468
(58) Field of Classification Search .......... 280/801.1, 280/801.2; 297/468, 482; 24/265 A, 265 H, 24/265 BC, 163 R, 305
See application file for complete search history.

(56) References Cited

U.S. PATENT DOCUMENTS

| | | | |
|---|---|---|---|
| 3,427,694 A | 2/1969 | Bullock | |
| 3,806,999 A | 4/1974 | Fieni | |
| 4,575,118 A | 3/1986 | Matsui et al. | |
| 4,611,854 A * | 9/1986 | Pfeiffer | 297/468 |
| 5,188,425 A | 2/1993 | Foster et al. | |
| 5,671,948 A * | 9/1997 | Susko et al. | 280/801.1 |
| 6,615,461 B2 * | 9/2003 | Suyama | 24/633 |
| 7,445,244 B2 * | 11/2008 | Taylor | 280/801.2 |
| 2007/0138782 A1 | 6/2007 | Murthy et al. | |

FOREIGN PATENT DOCUMENTS

DE 42 14 600 A1 11/1992

* cited by examiner

*Primary Examiner*—Paul N Dickson
*Assistant Examiner*—Drew Brown
(74) *Attorney, Agent, or Firm*—Sally J. Brown; Brinks Hofer Gilson & Lione

(57) ABSTRACT

A seatbelt anchor assembly for a motor vehicle seatbelt restraint system. The anchor assembly includes an anchor and a separate ferrule component. The anchor forms an engagement for the seatbelt and has an extending plate end. The ferrule component is adapted to be mounted to the vehicle through various means such as cable or direct mechanical fastener attachment. The ferrule forms a U-shaped cross-section which engages with the anchor and interlocks with it. In one embodiment, a retaining clip is provided enabling the anchor and ferrule components to be assembled without tools. A pair of holes is provided to enable final connection to be provided through a threaded fastener. Features are provided to prevent to make it apparent that the components are improperly assembled.

21 Claims, 5 Drawing Sheets

SEATBELT ANCHOR ASSEMBLY

FIELD OF THE INVENTION

This invention relates to a seatbelt anchor assembly adapted for use as part of a motor vehicle seatbelt restraint assembly.

BACKGROUND OF THE INVENTION

Seatbelt assemblies are in widespread use in motor vehicles. Present systems have certain common elements including seatbelt webbing which extends across the upper and lower torso of the occupant, and a retractor for allowing protraction and retraction of the webbing so that the belt may adapt to different sizes of occupants and be conveniently out of the way when not being used. Seatbelt assemblies further typically include a buckle which releasably attaches to a latch plate. Other common elements include deflectors or D-rings which reroute the webbing to properly position it with respect to the occupant to provide the desired restraint performance along with comfort and convenience of use.

Seatbelt assemblies must be securely affixed to motor vehicle structural elements in order to provide the necessary restraint effect in vehicle impact conditions and further to meet government regulations. Most frequently, elements of the seatbelt assembly are mounted to the vehicle structure such as the floor pan, roof rail, body pillars, or seats using threaded fasteners. For some designs of seatbelt systems, it is necessary to affix two components together to provide an anchor assembly and the two parts may be attached together at various stages of an assembly process and perhaps at different locations. For such applications, an anchor component is provided which is affixed to the seatbelt webbing and may for example include a D-ring or aperture for receiving belt webbing, which is connected with a separate ferrule or other mounting element adapted to be affixed to the vehicle. Since these parts are separate, they must be assembled at some point in the assembly process. Moreover, some designs of seatbelt restraint systems must be adapted for mounting to various types of vehicle applications. For example, in some instances an anchor is bolted directly to a vehicle structure element through a metal connector strap having an aperture for receiving a mounting bolt. In other applications, a cable having an end affixed to the motor vehicle and another end affixed to the anchor is used. It is desirable to provide a seatbelt anchor assembly which can be readily adapted for both strap and cable mounting applications as well as other potential mounting applications.

Since it is often necessary to mate the above-mentioned components of an anchor assembly for such applications, it is desirable that these parts can be fitted together during the assembly process and maintained in an attached condition until final attachment and securement of the components can be accomplished. By retaining these parts together, they are maintained in an assembled condition.

Since seatbelt anchor assemblies must bear significant tensile forces during operation and testing, the two components which mate together to form the anchor assembly must be structurally robust in order to meet these requirements, and their proper assembly should be easily attained and visually apparent.

A seatbelt anchor assemblies in accordance with this invention provide the above-mentioned features of adaptability, ease of assembly, and structural integrity.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
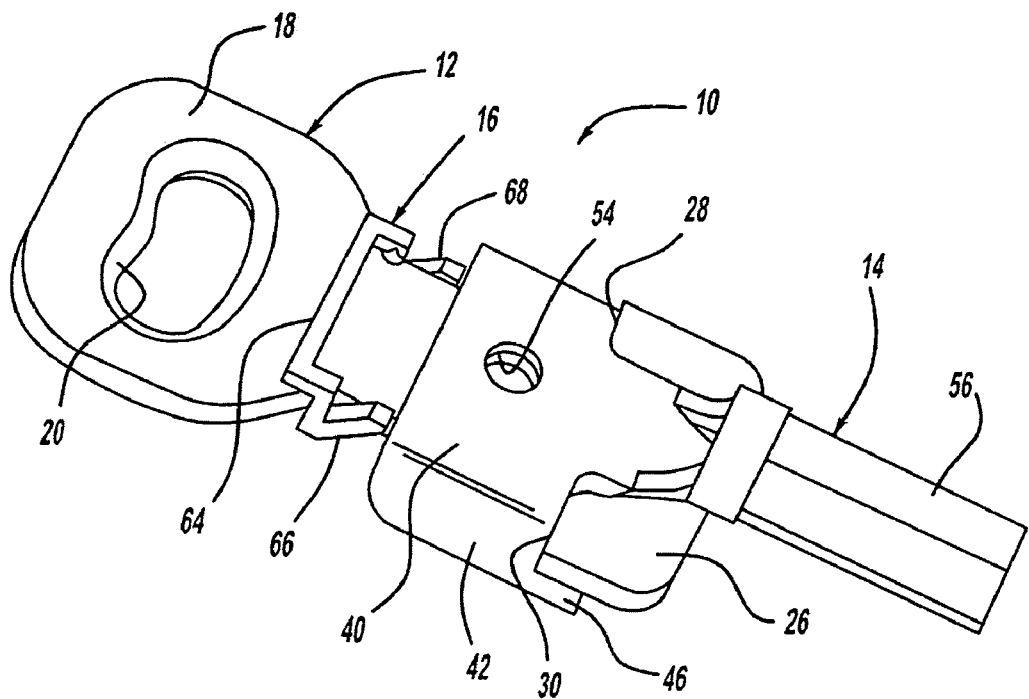
FIG. 1 is a perspective view of a seatbelt anchor assembly in accordance with a first embodiment of this invention shown with the ferrule having a cable attachment end.
Figure 3:
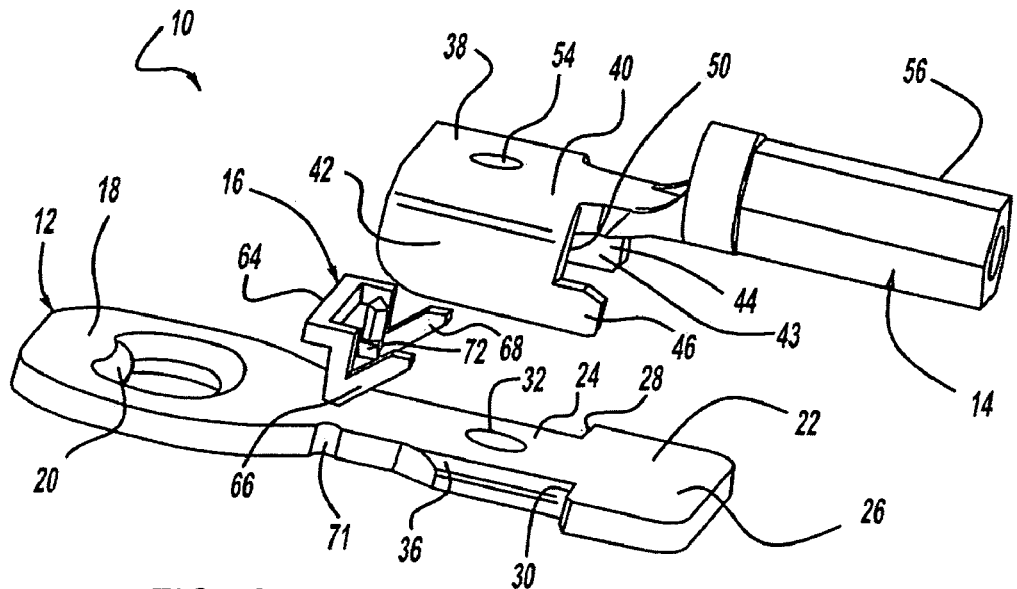
FIG. 3 is an exploded pictorial view of the components of the seatbelt anchor assembly shown in FIG. 1 in an exploded unassembled condition.

A seatbelt anchor assembly in accordance with the first embodiment of this invention is illustrated in FIGS. 1 and 3. The anchor assembly includes a pair of primary structural components, including anchor 12, ferrule 14, and further has retaining clip 16. FIG. 1 illustrates these components in an assembled position, whereas FIG. 3 shows the parts in an exploded apart position.

Anchor 12 is preferably formed from sheet metal stock and includes a connection end 18 which, in the embodiment illustrated, includes a central aperture 20 adapted to receive seatbelt webbing (not shown). Connection end 18 could alternatively mount a belt buckle or other belt restraint system component. Preferably, if webbing is routed through aperture 20, the edges of the aperture would feature rounded edges or, in some cases, a resin coating is used to provide smooth motion of the webbing through the aperture and prevents tearing or gouging of the webbing when it is under load. Anchor 12 further includes a projecting plate end 22. In a preferred embodiment, plate end 22 includes a mid-section 24 and an end section 26. The end section 26 is wider than the mid-section 24, thereby forming a pair of shoulder surfaces 28 and 30. As it will be explained in more detail in the later description, it is preferred that shoulder surfaces 28 and 30 be "misaligned" or at different positions along the length of anchor 12 to prevent misassembly of the components. Anchor 12 further forms hole 32 adapted to receive a threaded fastener when the components are in their final assembled condition. The edges of anchor mid-section 24 are shown having a relieved radius edge 36 which provides clearance for mating contact with ferrule 14.

Ferrule 14 is also formed preferably from sheet metal stock and includes an end section 38 which is U-shaped in cross-section. End 38 forms a plate section 40 and a pair of rolled sides 42 and 44, each preferably forming extending hooks 46 and 48, and notches 50 and 52. Plate 40 further forms hole 54 which is oriented to align with hole 32 when the components are in their assembled condition for receiving a fastener such as threaded bolt 74.

In order to permit anchor assembly 10 to be adapted for various vehicle applications, ferrule 14 in a first embodiment forms a cable crimping sleeve 56. Sleeve 56 has a hollow interior for receiving a mounting cable (not shown) and can be crushed to firmly affix the cable to ferrule 14. Another end of the cable is mounted to a vehicle structural component.

Figure 2:
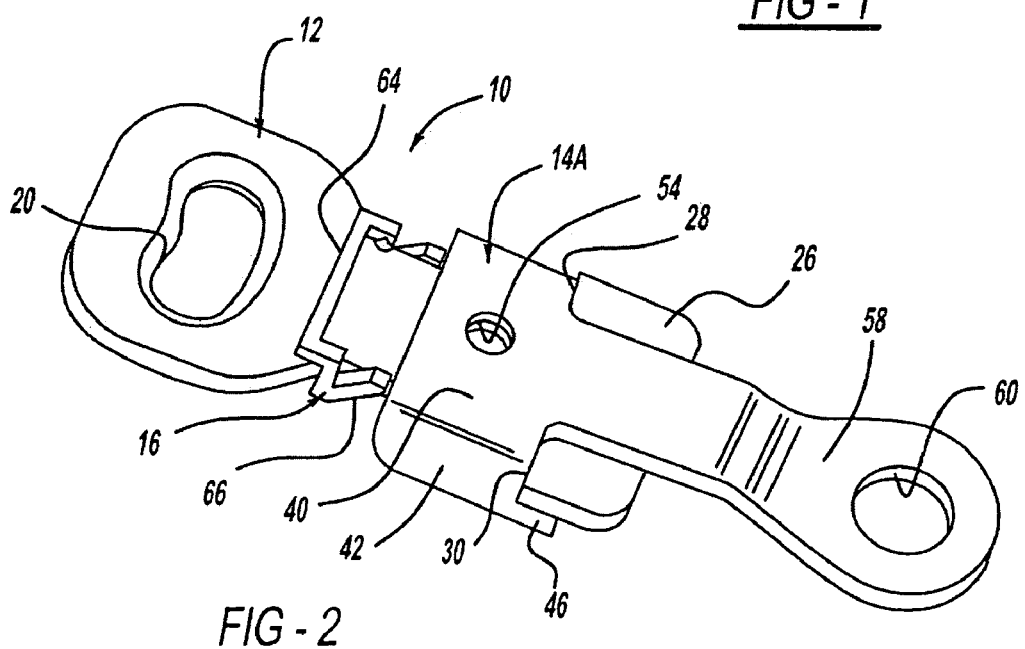
FIG. 2 is a pictorial view of the anchor assembly in accordance with a second alternative embodiment of this invention in which the ferrule is connected with a strap for vehicle attachment.

In another embodiment of the invention illustrated in FIG. 2, ferrule 14A features and extending strap 58 having a mounting aperture 60. Strap 58 can be directly mounted to a vehicle structural element through a threaded fastener connection passing through mounting aperture 60.

As illustrated particularly in FIGS. 1 and 3, retaining clip 16 includes a central bridge section 64 and a pair of V-shaped legs 66 and 68. The inner surfaces of legs 66 and 68 preferably includes ramp projections 70 and 72 such that clip 16 can be snapped into engagement with anchor 12. This occurs as the ramps 70 and 72 deflect as the clip is installed and snap against the face surface of anchor opposite the surface where bridge 64 is present. Anchor notches 71 and 73 receive ramps 70 and 72 to locate clip 16. FIG. 2 shows the position of retaining clip 16 as it would be installed into snap connection engagement with anchor 12. Once clip 16 is assembled, it is maintained in connection with anchor 12.

Figure 4:
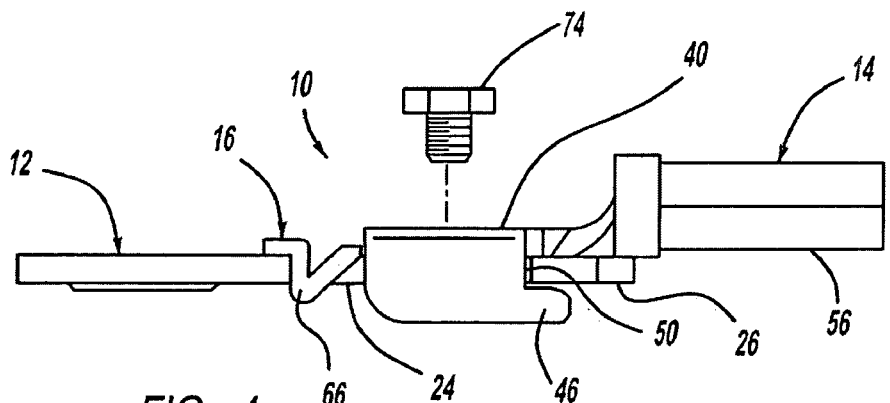
FIG. 4 is a side view of the assembly shown in FIGS. 1 and 3 showing the mechanical connection between the anchor and ferrule components.
Figure 5:
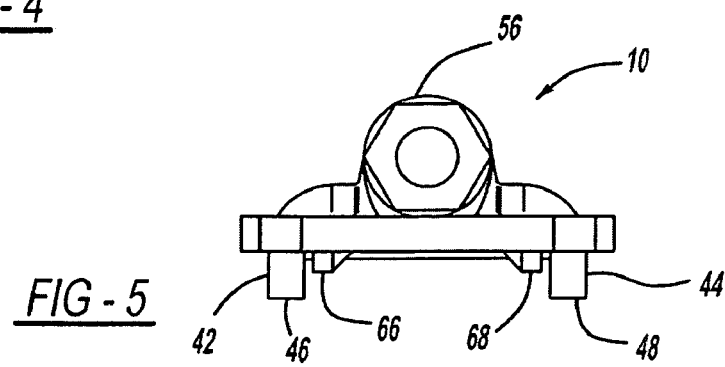
FIG. 5 is a front view of the assembly shown in FIGS. 1 and 3.
Figure 6:
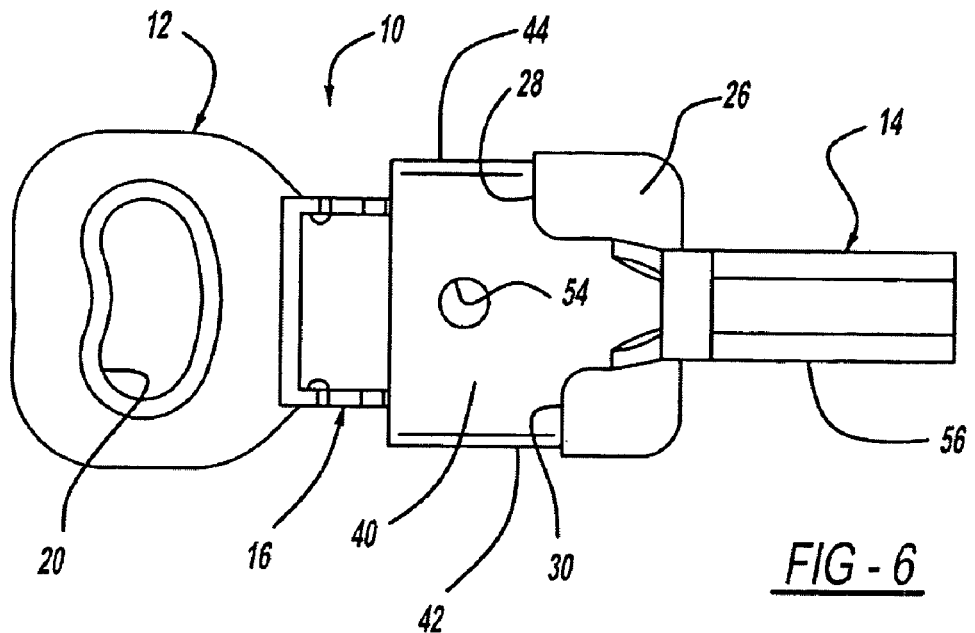
FIG. 6 is a bottom view of the assembly shown in FIGS. 1 and 3.

Ferrule 14 is assembled in connection with anchor 12 by sliding them together in a manner causing compression of clip legs 66 and 68 enabling hooks 46 and 48 to clear shoulders 28 and 30. Once in this position, tension is applied to the parts causing them to move to their assembled position illustrated in FIG. 1. In this position, as best shown by FIG. 4, hooks 46 and 48 interlock with anchor end section 26. Retaining clip legs 66 and 68 provide a compliant force urging anchor 12 and ferrule 14 into their assembled position as shown in FIG. 1. In this assembled condition, the assembly may be handled and shipped and later threaded fastener 74 may be installed.

Since ferrule 14 is formed of sheet metal, a radius is formed at the junctions between plate section 40 and sides 42 and 44. When the parts are assembled, relieved edges 36 of anchor 12 provide clearance to accommodate the inside radii of ferrule 14.

Figure 7:
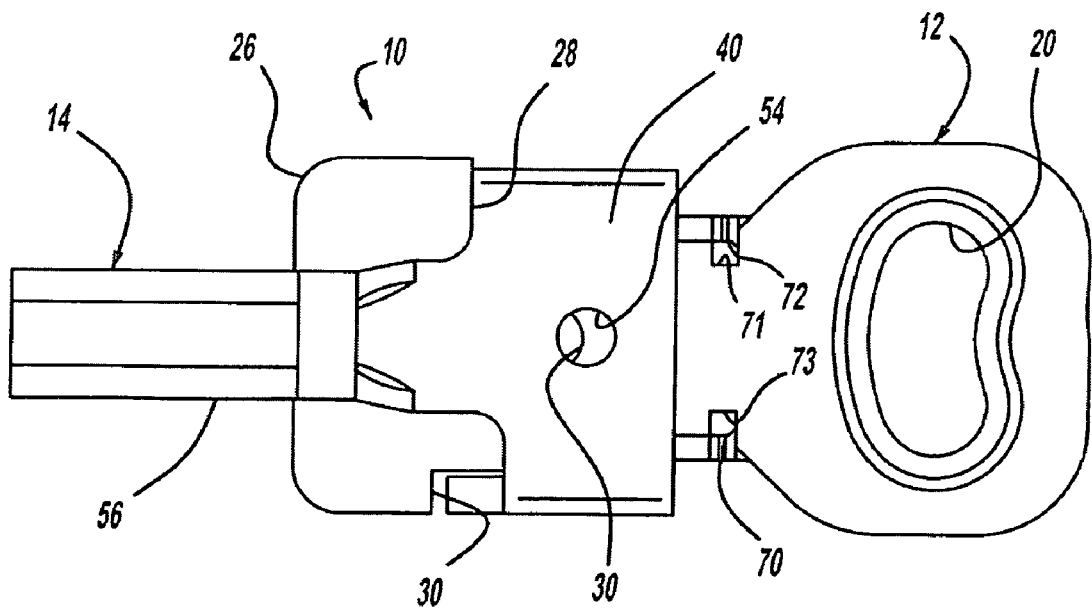
FIG. 7 is a plan view of the assembly shown in FIGS. 1 and 3 with the anchor and ferrule components improperly assembled.

As illustrated in FIG. 3, shoulder surfaces 28 and 30 are positioned at different positions along the length of anchor 12. The corresponding engaging surfaces of ferrule 14 are also misaligned in the same manner as are the shoulder surfaces. Thus, in a properly assembled condition, the components will reach the position shown in FIG. 1 in which case holes 32 and 54 align to receive the threaded fastener 74, shown in FIG. 4 as bolt 74. However, if the parts are assembled improperly with the anchor 12 or ferrule 14 in an upside down position, the parts cannot reach their assembled condition as illustrated in FIG. 7. As shown in that figure, holes 32 and 54 do not align and one of the hooks 48 does not engage the anchor shoulder 30, indicating improper assembly. The parts only fit together when ferrule plate 40 is placed against one face surface of anchor mid section 24, and not when placed against the opposite face surface.

During the assembly process, ferrule 14 may be affixed to anchor 12 in the manner described above and handled as part of a seatbelt assembly. When the final assembly process is completed for the seatbelt system, threaded fastener 74 is installed through holes 32 and 54. As best illustrated in FIG. 4, the interlocking connection between these components provides a high strength mechanical connection between them able to restrain the forces acting on these components during use and in compliance with government regulations. Depending on the application, either configuration of ferrule 14 or 14A may be used with anchor 17.

A seatbelt anchor in accordance with a third embodiment of this invention is illustrated in FIGS. 8 through 11. This anchor assembly 80 forms a pair of primary structural components similar to that of the first and second embodiments including anchor 82 and ferrule 84. This embodiment however, does not employ an element corresponding with retainer clip 16 described and shown in connection with the first and second embodiments. FIGS. 8 through 11 illustrate these components in an assembled condition. Anchor 82 is preferably formed from sheet metal stock and includes a connection end 86, which in the embodiment illustrated forms a central aperture 88 adapted to receive seatbelt webbing (not shown) for connection with an associated belt restraint system. Anchor 82 further forms a projecting plate end 90 forming mid-section 92 and end section 94. End section 94 is wider than mid-section 92 thereby forming a pair of shoulder surfaces 96 and 98. Anchor 82 further forms hole 102 adapted to receive a threaded fastener when the components are in their final assembled condition. Between connection end 86 and plate end 90, anchor 82 forms a narrowed neck section 91.

Figure 8:
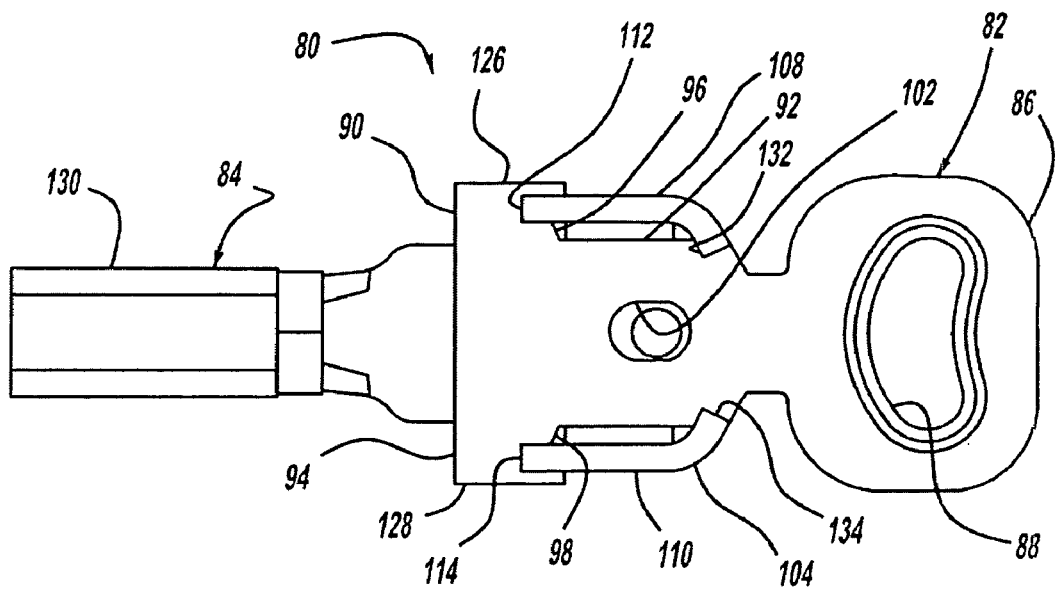
FIG. 8 is a top plan view of a seatbelt anchor assembly in accordance with in accordance with a third embodiment of this invention.
Figure 9:
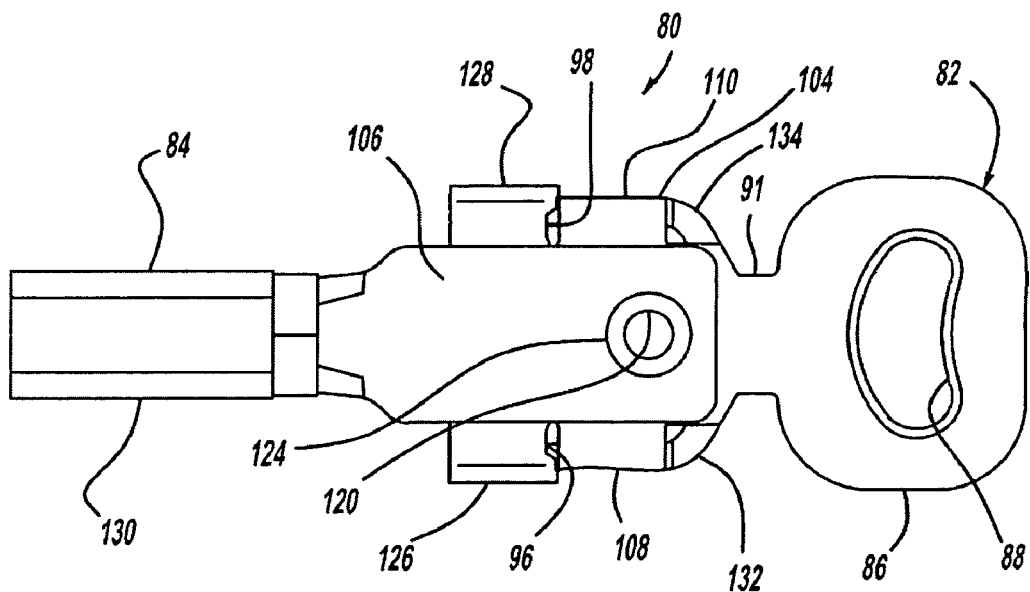
FIG. 9 is a bottom plan view of the assembly shown in FIG. 8.

Ferrule 84 is also preferably formed from sheet metal stock and includes end section 104 which is U-shaped in cross-section. End 104 forms a plate section 106 and a pair of rolled sides 108 and 110, each forming hooks 112 and 114 extending toward cable sleeve 130, and notches 116 and 118. Rolled sides 108 and 110 further form a second pair of hooks 132 and 134 with end bent toward the center of plate section 106. Plate 106 further forms hole 120 which is oriented to align with hole 102 when the components are in their assembled condition for receiving a fastener such as threaded bolt 74. Bushing 124 is welded to ferrule plate section 106 to provide additional thread engagement with fastener 74, to increase the clamping and retention force provided by the fastener. Fastener 74 is not shown with anchor assembly 80 but would be inserted through hole 102 to engage with bushing 124. In other words, the fastener would be inserted into engagement with the assembly as the components are shown in FIG. 8.

Figure 10:
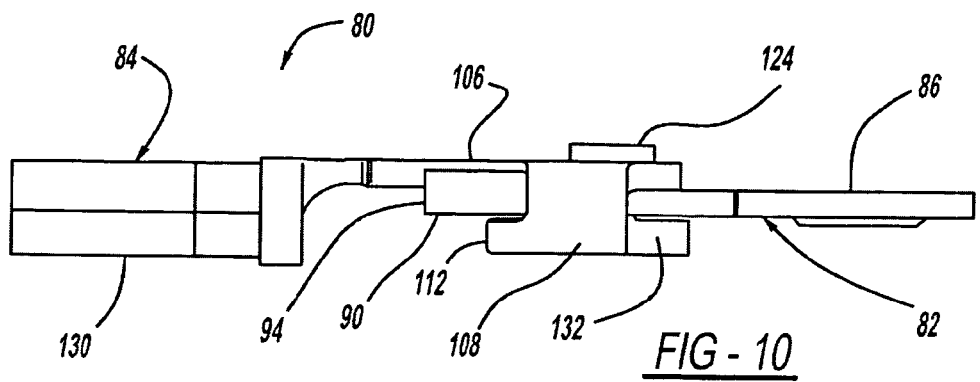
FIG. 10 is a side view of the seatbelt anchor assembly shown in FIG. 8.
Figure 11:
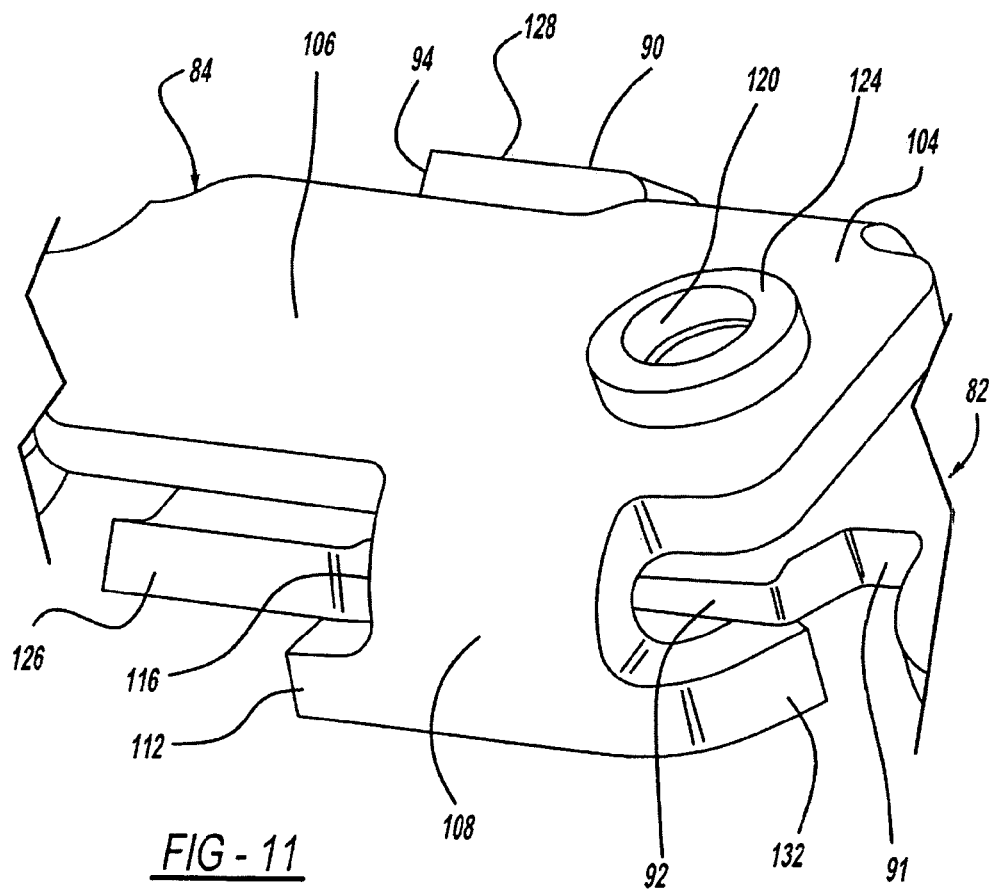
FIG. 11 is an enlarged perspective illustration of the mating of the anchor and ferrule components of the embodiment shown in FIG. 8.

Anchor end section 94 forms side edge sections 126 and 128 which are bowed or deflected toward ferrule plate section 106. This feature is best illustrated in FIGS. 10 and 11.

Like the first embodiments, anchor assembly 80 includes features to prevent improper assembly of anchor 82 and ferrule 84. The proper assembled condition is illustrated in FIGS. 8 through 11. Anchor 82 and ferrule 84 are mated together and then pulled apart such that they slide relative each other until ferrule 84 and hooks 112 and 114 engage with shoulders 96 and 98. In this assembled condition, hooks 132 and 134, which fit into anchor neck section 91 when the parts are being assembled, also overlap the anchor mid-section 92. As best shown in FIG. 11, edges 126 and 128, having their formed curled configuration, allow hooks 112 and 114 to interlock with them. Once in the final assembled condition shown in FIGS. 10 and 11, a threaded fastener 74 may be placed through holes 102 and 120 engaging with bushing 124.

Improper assembly of anchor assembly 80 is prevented since if an attempt were made to invert ferrule 84, the curled edges 126 and 128 would interfere with hooks 112 and 114. This would prevent the parts from reaching their final assembled condition in which holes 102 and 120 align, and thus placement of the fastener 84 is prevented.

In order to permit anchor assembly 80 to be mounted to the vehicle, ferrule 84 in the embodiment shown in FIGS. 8 through 11, forms a cable crimping sleeve 122 which is similar to ferrule 14 in accordance with the first embodiment of this invention. As illustrated in the descriptions of the first and second embodiment, ferrule 84 could also be adapted to include a strap for mounting to the vehicle or some other feature for mounting could be provided.

This description defines a configuration of anchors 12 and 82 and ferrules 14 and 84 and their interengagement. It is recognized that the features of one of these components may be provided on the other component while achieving the aims and features of this invention. Thus ferrule 14 or 84 could, in such an alternative configuration, have the features of anchor plate end 22 or 90, with the anchor 12 or 82 having the "U"-shaped cross-section shape with the sides and hooks described for the ferrule.

While the above description constitutes the preferred embodiment of the present invention, it will be appreciated that the invention is susceptible to modification, variation and change without departing from the proper scope and fair meaning of the accompanying claims.

The invention claimed is:

1. A seat belt anchor assembly for a motor vehicle belt restraint system and adapted for connection with webbing of the restraint system, the assembly comprising:
   a first and a second component, one of the first or second components configured in the form of an anchor for connection with the webbing and the other of the first or second component configured in the form of a ferrule for connection with a structural component of the vehicle,
   the first component having a connection end and a generally flat plate end, the first component further forming a mid section and an end section, the end section having a width greater than the mid section and forming at least one shoulder surface between the mid section and the end section, and
   the second component forming a generally "U" shaped cross section adapted to receive the first component flat plate end, the second component further forming at least one hook which engages with the first component flat plate end and the second component engaging the first component shoulder when the first component and the second component are in an assembled position.

2. The seat belt anchor assembly in accordance with claim 1 further comprising the at least one hook of the second component including a first pair of hooks engaging the first component flat plate end and a second pair of hooks which fit within a neck section formed by the first component, and when the first and second components are assembled, the second pair of hooks overlap the first component flat plate end.

3. The seat belt anchor assembly in accordance with claim 1 further comprising the at least one shoulder surface including a first and a second shoulder surface with the first and second shoulder surfaces spaced at different positions along the length of the first component, whereby the second component mates with the first component and can be placed in the assembled position only when the second component is placed into contact with only one of two face surfaces formed by the first component.

4. The seat belt anchor assembly in accordance with claim 1 further comprising, a clip for urging the first and second components to be maintained in the assembled position, the clip affixed to the one of the first or second components and having a spring arm which engages the other of the first or second components to urge the first component and the second component to engage in the assembled position.

5. The seat belt anchor assembly in accordance with claim 4 further comprising wherein the clip spring arm further urges the first component flat plate end to contact the second component.

6. The seat belt anchor assembly in accordance with claim 4 further comprising the clip having a center bridge section and a pair of the spring arms.

7. The seat belt anchor assembly in accordance with claim 4 further comprising the clip further having a pair of legs which snap into engagement with the one of the first component and the second component to affix the clip to the first or second component.

8. The seat belt anchor assembly in accordance with claim 1 further comprising the first or second component further forming a cable attachment sleeve for receiving a cable for mounting to the structural component of the vehicle.

9. The seat belt anchor assembly in accordance with claim 1 further comprising the first or second component further forming a strap having a mounting aperture for mounting to the structural component of the vehicle.

10. The seat belt anchor assembly in accordance with claim 1 further comprising the first component in the form of the anchor and the second component in the form of the ferrule.

11. The seat belt anchor assembly in accordance with claim 1 further comprising the first component forming a first hole for receiving a fastener, the second component forming a second hole for receiving the fastener, the holes of the first and second components aligning to receive the fastener when the first component and the second component are in the assembled position.

12. A seat belt anchor assembly for a motor vehicle belt restraint system and adapted for connection with webbing of the restraint system, the assembly comprising:
   a first and a second component, one of the first or second component configured in the form of an anchor for connection with the webbing and the other of the first or second component configured in the form of a ferrule for connection with a structural component of the vehicle,
   the first component having a connection end and a generally flat plate end and forming a mid section and an end section, the end section having a width greater than the mid section and forming first and second shoulders surfaces between the mid section and the end section, the first component forming a first hole for receiving a fastener, and
   the second component forming a generally "U" shaped cross section adapted to receive the first component flat plate end, the second component further forming at least one hook which engages with the first component flat plate end when the first component is moved to an assembled position wherein the second component engages the first component shoulder surfaces, the second component forming a second hole for receiving a fastener, the holes of the first component and the second component aligning to receive the fastener when the first component and the second component are in the assembled position.

13. The seat belt anchor assembly in accordance with claim 12 further comprising the at least one hook of the second component including a first pair of hooks engaging the first component flat plate end and a second pair of hooks which fit within a neck section formed by the first component, and when the first and second components are assembled, the second pair of hooks overlap the first component flat plate end.

14. The seat belt anchor assembly in accordance with claim 13 further comprising the first and a second shoulder surfaces spaced at different positions along the length of the first component, whereby the second component mates with the first component and can be placed in the assembled position only when the second component is placed into contact with only one of two face surfaces formed by the first component.

15. The seat belt anchor assembly in accordance with claim 12 further comprising, a clip for urging the second component to engage the first component in the assembled position, the clip affixed to the first component and having a spring arm which engages the second component to urge the first component and the second components to engage in the assembled position.

16. The seat belt anchor assembly in accordance with claim 15 further comprising the clip spring arm further urges the first component flat plate end to contact the second component.

17. The seat belt anchor assembly in accordance with claim 15 further comprising the clip having a center bridge section and a pair of the spring arms.

18. The seat belt anchor assembly in accordance with claim 15 further comprising wherein the clip spring arm further having a pair of legs which snap into engagement with the first component to affix the clip to the first component.

19. The seat belt anchor assembly in accordance with claim 12 further comprising the second component further forming a cable attachment sleeve for receiving a cable for mounting to the structural component of the vehicle.

20. The seat belt anchor assembly in accordance with claim 12 further comprising the second component further forming a strap having a mounting aperture for mounting to the structural component of the vehicle.

21. The seat belt anchor assembly in accordance with claim 12 further comprising the first component in the form of the anchor and the second component in the form of the ferrule.

* * * * *